United States Patent [19]
Hostetter et al.

[11] Patent Number: 5,450,395
[45] Date of Patent: Sep. 12, 1995

[54] CODE POSITION MODULATION SYSTEM AND METHOD FOR MULTIPLE USER SATELLITE COMMUNICATIONS

[75] Inventors: George R. Hostetter, Santa Clara; Daniel Babitch, San Jose, both of Calif.

[73] Assignee: Trimble Navigation Limited, Sunnyvale, Calif.

[21] Appl. No.: 179,115

[22] Filed: Jan. 10, 1994

Related U.S. Application Data

[62] Division of Ser. No. 868,985, Apr. 14, 1992, Pat. No. 5,313,457.

[51] Int. Cl.$^6$ ............................................... H04J 13/02
[52] U.S. Cl. ..................................... 370/18; 375/205; 455/50.1; 455/38.3
[58] Field of Search ...................... 370/18, 17, 50, 69.1, 370/70, 105.4, 105.5, 110.4, 115.1, 95.1, 95.3; 375/1, 116, 115, 118, 38, 40, 58, 60, 101, 107, 108, 111, 112, 113, 56, 42, 51, 52, 53; 455/50.1, 54.1, 59, 63, 12.1, 32.1, 38.3; 371/43, 46; 381/2, 13, 14; 379/59, 60

[56] References Cited

U.S. PATENT DOCUMENTS

| | | | |
|---|---|---|---|
| 5,056,109 | 10/1991 | Gilhousen et al. | 375/1 |
| 5,101,501 | 3/1992 | Gilhousen et al. | 370/18 |
| 5,235,615 | 8/1993 | Omuir | 370/18 |
| 5,267,262 | 11/1993 | Wheatley | 370/18 |
| 5,280,472 | 1/1994 | Gilhousen et al. | 370/18 |

OTHER PUBLICATIONS

Scott Miller, "An Efficient Channel Coding Scheme for Direct Sequence CDMA Systems," IEEE MILCOM '91, pp. 52.6.1 to 52.6.5.

Primary Examiner—Benedict V. Safourek
Assistant Examiner—Dang Ton
Attorney, Agent, or Firm—Thomas E. Schatzel

[57] ABSTRACT

An embodiment of the present invention is a communications system for multiple users sharing the same maximal length code (MLC) in a code position modulation multiple access environment. A 1023 chip length code is transmitted with reference to an independent coordinated time source. The code repeats every time after 1023 chips have been transmitted. The MLC will begin each time period with the first through 1023$^{rd}$ chip, depending on the data to be sent and the identity of the user transmitting it. The chips belonging to the MLC that were not sent at the beginning of a time period are sent at the end to complete the MLC each time period in a wrap around fashion. Each time period can be arbitrarily divided into subsections embracing, for example, sixteen chip times. When so divided, more than sixty subsections are possible from one 1023 chip MLC. Respective users are each assigned a subsection. If the transmitted MLC begins on one of the sixteen chip time slots in a particular user's assigned subsection, the chip time slot that the MLC does begin on will be interpreted as communicating four bits of data, 0000 ... 1111.

5 Claims, 8 Drawing Sheets

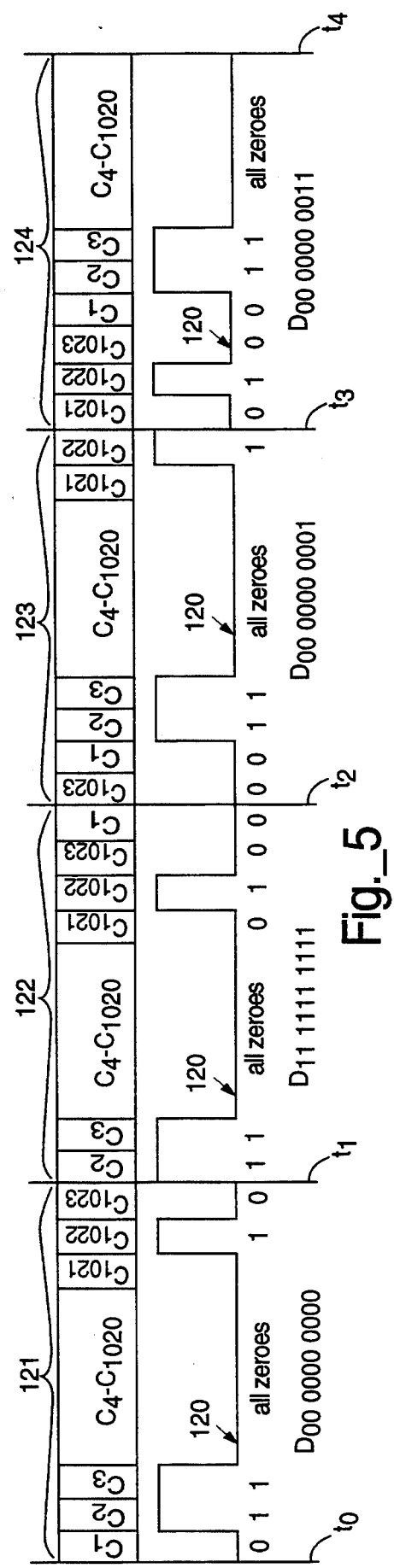
Fig._5

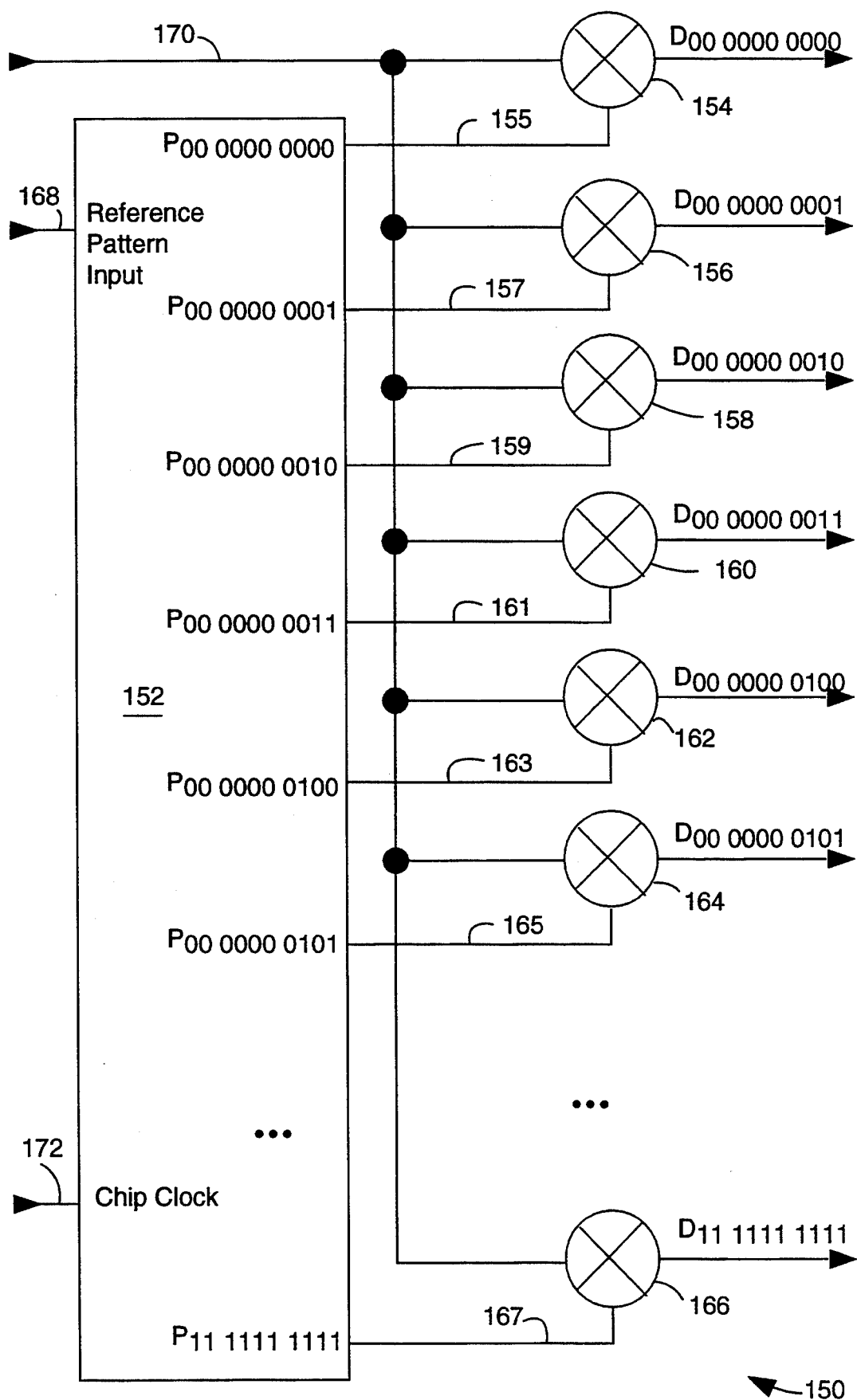
FIG._6

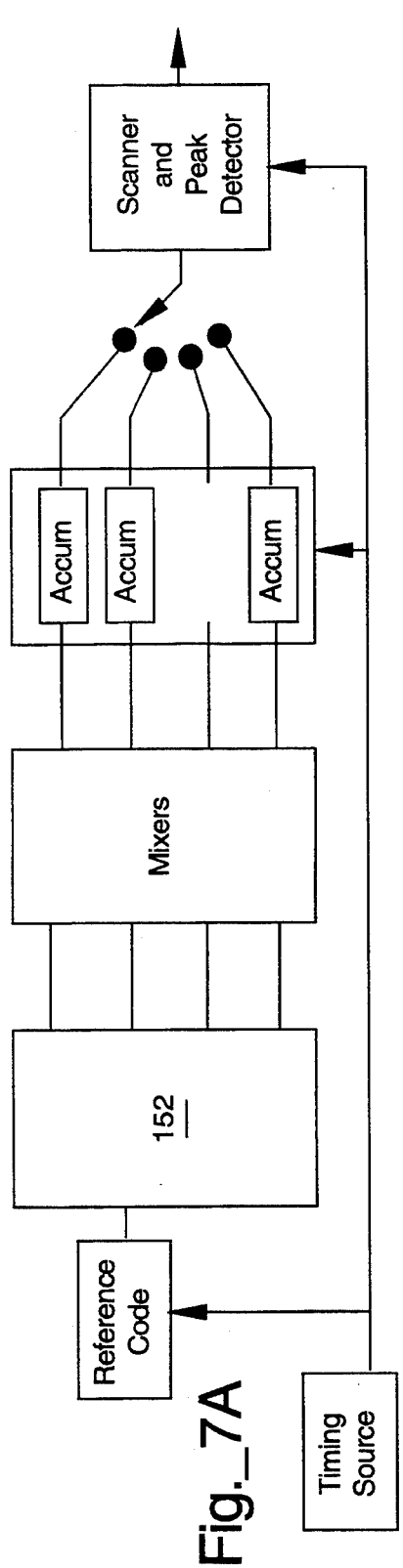
Fig._7A
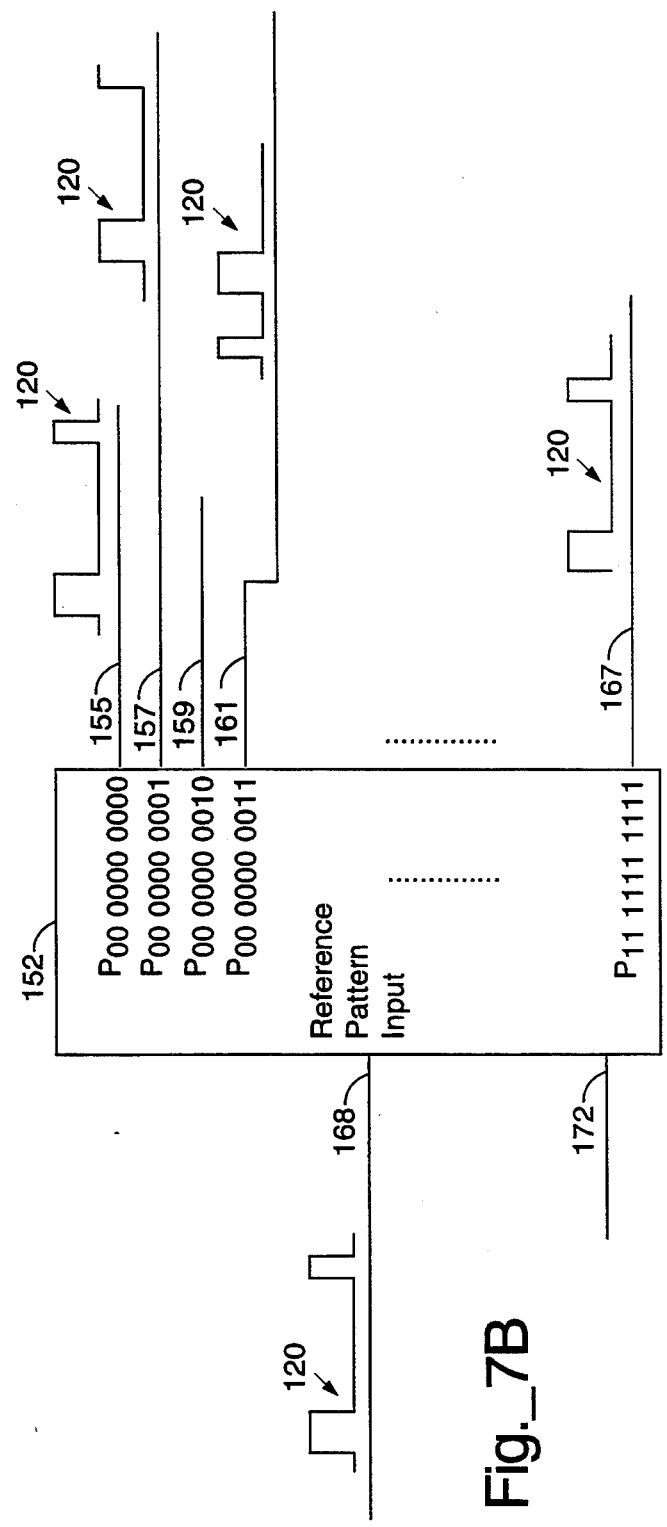
Fig._7B

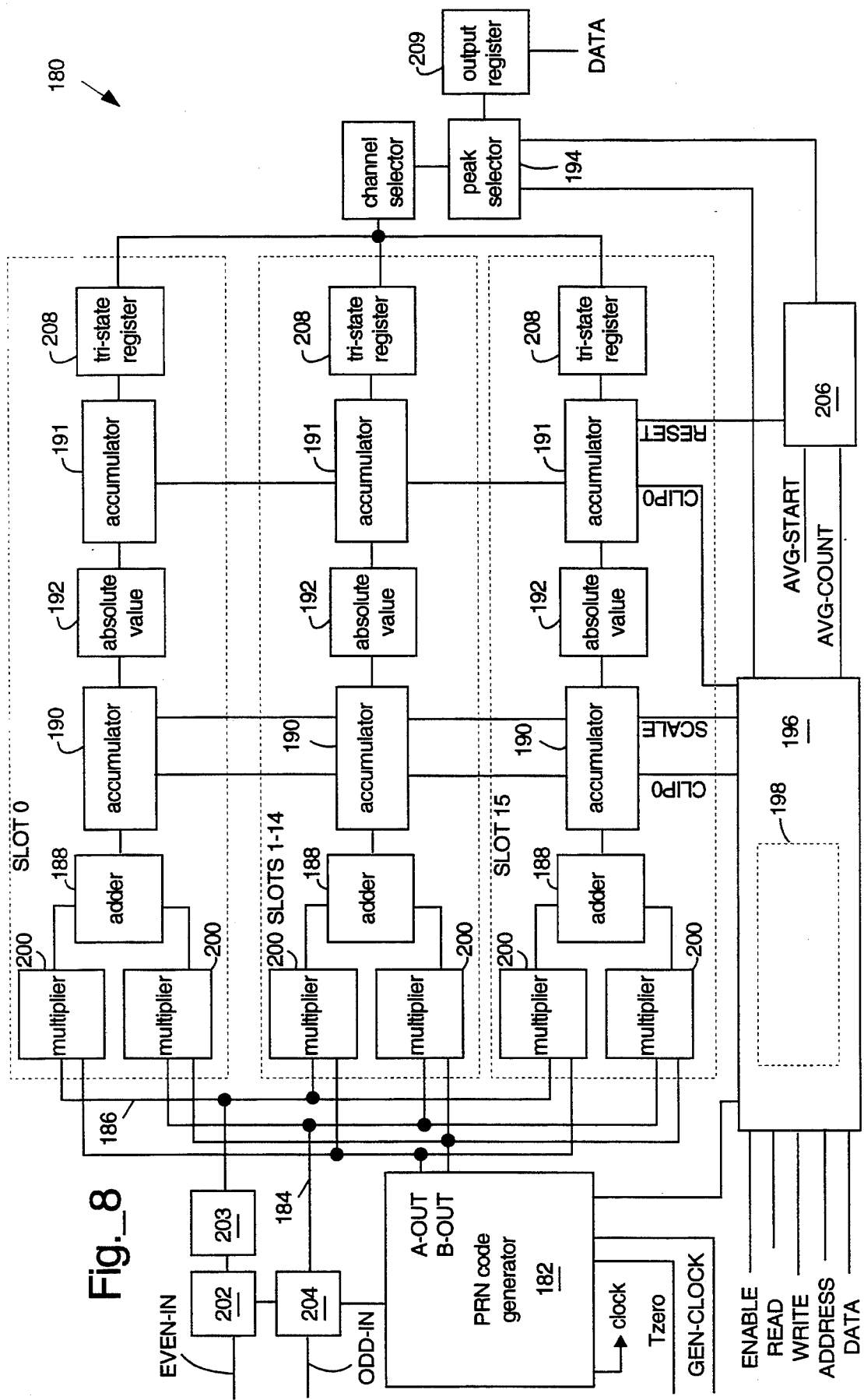
Fig._8

CODE POSITION MODULATION SYSTEM AND METHOD FOR MULTIPLE USER SATELLITE COMMUNICATIONS

This is a divisional of application Ser. No. 07/868,985 filed on Apr. 14, 1992 now U.S. Pat. No. 5,313,457.

BACKGROUND OF THE INVENTION

1. Field of the Invention

The invention relates generally to communications systems and more specifically to code position modulation multiple access schemes that use maximal length codes and exist to support several simultaneous users.

2. Description of the Prior Art

Radio communications system have evolved numerous ways to modulate information on a radio carrier. Amplitude, frequency, and phase modulation are some of the most common scheme. Both analog and digital techniques are used to communicate voice, video and computer data. The digital techniques are especially suited to computer data. Basically, communicating information over a radio carrier involves modulating the carrier. Some transmitted energy will be dispersed into sidebands by the modulation and it is these sidebands that carry the information. More power can be put into the sidebands if the carrier, which carries no information generally, is suppressed or eliminated. Similarly, only one of the two sidebands is strictly necessary, so single sideband (SSB) is an effective use of transmitter power.

Satellite communications are usually constrained by relatively low power levels because the generation of high power levels in an orbiting satellite is expensive and difficult to sustain. A class of communications called spread spectrum is particularly suited to satellite communications because it allows very small aperture (broad beam) antennas to be used on the ground without excessive interference to adjacent satellites other than the desired satellite. Spread spectrum communication uses the modulation to spread the radio carrier over a very wide range of frequencies.

Spread spectrum techniques have no special advantage or disadvantage with respect to operation under natural background noise conditions, except for the unique waveform of the present invention. A difficulty in all code division multiple access (CDMA) systems is control of the cross-user interference, which is the degrading or noise-like effects of undesired user signals on the signal to be received. To address a need for multiple user spread spectrum communication, code division multiple access (CDMA) evolved. However, cross-user noise remains a significant problem area in CDMA communications.

Horwitz describes in U.S. Pat. No. 4,644,523, issued Feb. 17, 1987, a way to improve the signal-to-noise ratio in a CDMA receiver using a direct sequence spread spectrum wherein a plurality of transmitters and at least one receiver are synchronized to a common timing source. Each transmitter sends a data signal spread by a bipolar pseudo-random code which is a different assigned shift of a common bipolar code sequence. The receiver has a plurality of correlation detectors, each generating two local bipolar pseudo-random codes that are replicas of the transmitter codes. One of the locally generated codes has the same code sequence shift as the code assigned to the predetermined transmitter. Horwitz notes that in spread spectrum communications spreading of the signal bandwidth beyond the bandwidth normally required for data being transmitted is done by phase shift keyed (PSK) modulating a carrier waveform by the data to be transmitted. Then the resultant signal is modulated by a reference pseudo-random code of length L running at a repetition rate which is normally twice the data rate. Demodulating involves heterodyning or multiplying the signal by the same reference code used to spread the composite transmission. Assuming that the transmitted and locally generated receiver codes are synchronous, the carrier inversions caused by the code PSK modulation are removed and the original base-band modulated carrier is restored by the receiver.

Another way to support multiple users is to separate them by assigning each a time slot period for communication. Such a scheme has been commonly used in satellite communications system. For example, Gilhousen, et al., were issued U.S. Pat. No. 4,979,170, on Dec. 18, 1990, which describes a message communication system having centralized communication stations that transmit messages through earth orbit repeater satellites to/from mobile terminals. The communication system uses time division multiple access (TDMA) with a number of channels designated address channels and the remaining channels used for data transfer. A primary problem of TDMA for small users is that since transmission is accomplished in a short, high-speed burst, the peak radio power must be high. In general, small, lightweight solid-state electronics are not able to generate transmit power this way.

CDMA systems can not support as many users as the number of code perturbations would seem to indicate as possible because of cross-user noise. Before all possible codes are being used, the cross-user noise becomes so great that all users' signals are degraded to the point of being unusable. Codes interact differently, depending on the particular codes involved. A great deal of study and experimentation has resulted in a limited set of codes and code combinations being preferred. The combinations that work best together are known to those skilled in the art as Gold Codes. The limited number of known Gold Codes constrains how many users can share the same channel, albeit with different codes. The signal-to-noise ratio (SNR) due to the cross-correlation of many codes against the desired receiver code does not exceed $$\frac{\sqrt{n}}{k},$$

where k is the number of simultaneous users and n is the length of the code. For example, with a code length of 511, the best possible SNR for ten simultaneous users is 3.5 dB. The number of Gold Codes that can actually be simultaneously used is insufficient for the number of simultaneous users in the field that are desirable to deploy, primarily because of cross-user interference.

A system and method of CDMA communication is needed that greatly expands the number of users possible in a single environment and that improves the signal separation between users and does not degrade the performance under natural background noise conditions.

SUMMARY OF THE PRESENT INVENTION

It is therefore an object of the present invention to provide a communication system that expands the capabilities of spread spectrum CDMA communication in multi-user environments, beyond the performance limits of conventional CDMA.

Briefly, one preferred embodiment of the present invention includes a communications system for multiple users sharing the same maximal length code (MLC) in a multiple access environment. A 1023 chip length code is transmitted with reference to a time period that repeats every time after 1023 chips have been transmitted. All transmitters and receivers have a source of coordinated time such as the global positioning system (GPS). The MLC will begin each time period with the $n^{th}$ chip, where n depends on the data to be sent and which user is transmitting it. The chips belonging to the MLC that were not sent at the beginning of a time period are sent at the end to complete the MLC each time period in a wrap around fashion. Each time period can be arbitrarily divided into subsections embracing, for example, sixteen chip times. When so divided, more than sixty subsections are possible from one 1023 chip MLC. Respective users having separate time reference sources are each assigned a subsection. If the transmitted MLC begins on one of the sixteen chip time slots in a particular user's assigned subsection, the chip time slot that the MLC does begin on will be interpreted as communicating four bits of data, 0000 . . . 1111.

An advantage of the present invention is that it provides a system that supports substantially more users with greater separation than has previously been possible.

Another advantage of the present invention is that it provides a system in which the simultaneous user SNR is $$\frac{n}{k}$$

because all correlations are auto correlations and because the sidelobe autocorrelation noise of a maximal length code is $$\frac{1}{n},$$

where n is the code length. For example, with a code length of 511 and fifty-one simultaneous users, the SNR is ten dB, and is substantially better than CDMA.

Another advantage of the present invention is that it provides a system in which more users can simultaneously use the system at higher data rates than in conventional CDMA.

Another advantage of the present invention is that the bit error rate (BER) versus Eb/No in embodiments of the present invention which include forward error correction coding are superior in performance by one to two dB, compared to binary phase shift key (BPSK) signals which have been forward error correction coded.

Another advantage of the present invention is that the bit error probability (BER) versus Eb/No in embodiments of the present invention with Reed-Solomon error correction have BER magnitudes that degrade smoothly as the Eb/No levels fall and yet the BER levels are substantially below that for Viterbi and even Viterbi combined with Reed-Soloman BPSK encoded signals at any given Eb/No level. Viterbi and Viterbi+- Reed-Soloman BPSK encoded signals fail abruptly at low Eb/No levels.

A still further advantage of the present invention is that it provides a system in which fewer channels with higher data rates, or more channels with lower data rates or a mixture of various data rates can be provided without changing the basic waveform broadcast.

Another advantage of the present invention is that it provides a system in which the length of the maximal-length code can be tailored to a given set of network requirements to optimize different aspects of network functionality.

These and other objects and advantages of the present invention will no doubt become obvious to those of ordinary skill in the art after having read the following detailed description of the preferred embodiments which are illustrated in the various drawing figures.

IN THE DRAWINGS

FIG. 5 is a diagram of an example of four sequential transmissions of the same maximal length code (MLC) showing the effects of data modulation with respect to reference time;

FIG. 6 is a block diagram of a correlator used to demodulate the MLC transmission of FIG. 5 and in the RTU of FIG. 3;

FIG. 7A is a block diagram of a system that includes the correlator of FIG. 6;

FIG. 7B is a diagram of the respective MLC patterns present at points related to the correlator and system of FIGS. 6 and 7A; and FIG. 8 is a block diagram of an integrated circuit implementation of a correlator having the same purpose as the correlator of FIG. 6 and useful in the RTU of FIGS. 1 and 3.

DETAILED DESCRIPTION OF THE PREFERRED EMBODIMENTS

Figure 1:
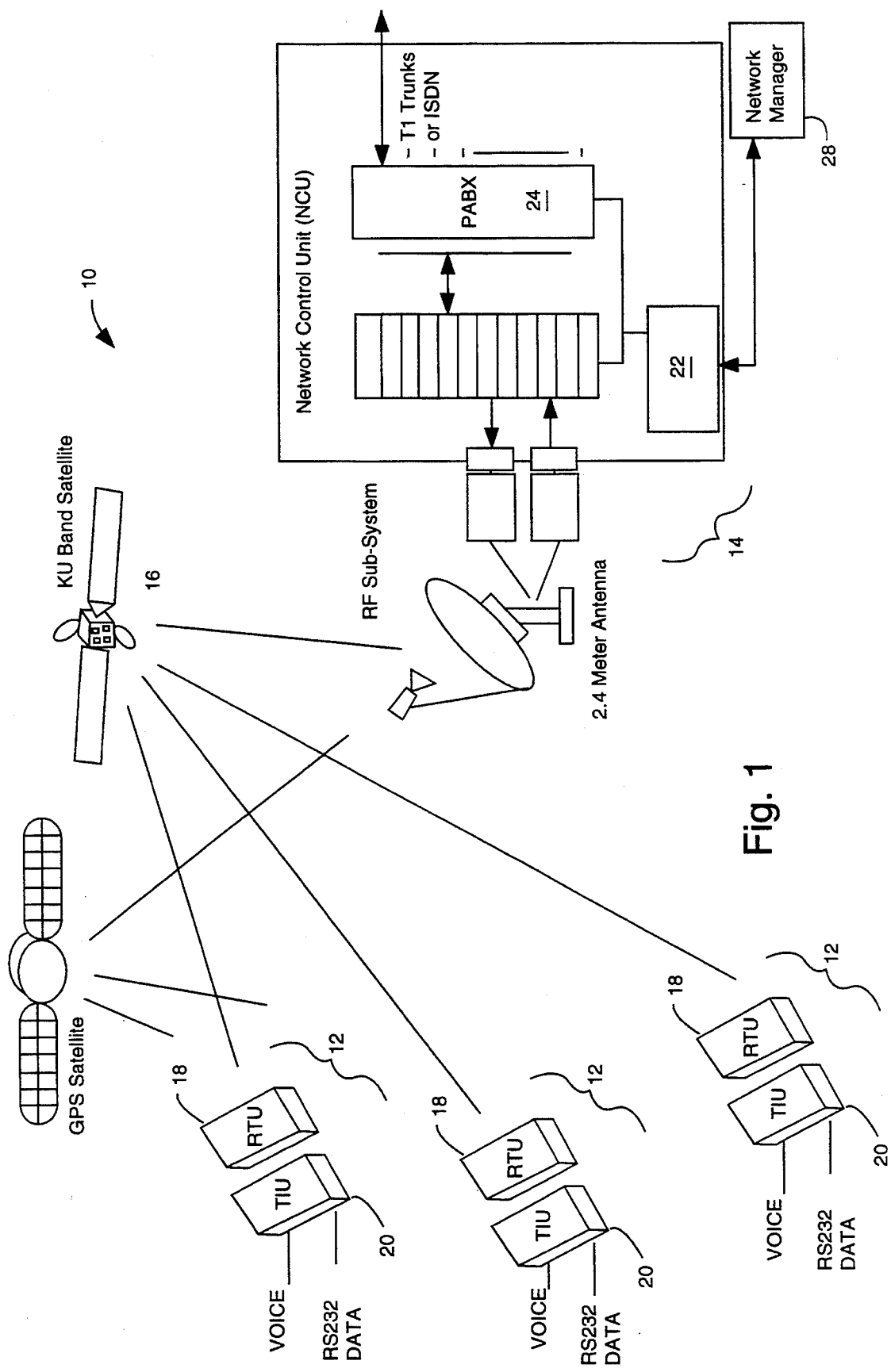
FIG. 1 is a diagram of a satellite based communications system incorporating an embodiment of the present invention.

FIG. 1 is a communication and position reporting system 10 in accordance with the present invention comprising a plurality of lightweight suitcase portable terminals 12, and a hub terminal 14 in combination with a Ku-band satellite 16. Each terminal 12 includes a receive-transmit unit (RTU) 18 and a terminal interface unit (TIU) 20. System 10 communicates voice, data and/or image transmission services via a code position modulation multiple access (CPMMA) waveform. One or more GPS satellites provide a system of time referencing. The portable terminals 12 operate in the fixed satellite service (FSS), for example, in the Ku (11-15 GHz) band. Each terminal 12 and 14 preferably have a GPS receiver to enable access to precision time references. A star type network is thus configured with connectivity between terminals 12 via leased satellite segment transponder space. Other network configurations can also make use of the CPMMA waveform. A multiplicity of star networks each operating in a different frequency band is also possible. Terminals 12 and 14 are preferably designed to operate in any geographical location where there is Ku-band satellite coverage. A suitable model for use with system 10 is the GTE Spacenet GSTAR I-IV series.

GSTAR Satellite Parameters

System 10 typically operates with an uplink and down link path of hub terminal 14 located in a regional East and/or West coast beam, while the portable terminals 12 are located in the CONUS beam. This allows continuous connectivity under transportable or mobile conditions. Table I summarizes typical GSTAR series operational parameters that can be anticipated.

TABLE I

| SATELLITE | EIRP CONUS (typical) | EIRP Regional (typical) | G/T (typical) |
|---|---|---|---|
| GSTAR I/II | 42 dBW | 46 dBW | 0 dB/K |
| GSTAR III | 40 dBW | 44 dBW | 0 dB/K |
| GSTAR IV | 41 dBW | 44 dBW | +2 dB/K |

System Operation

A remote user interface into system 10 is via an integrated services digital network (ISDN) channel, which allows voice and data to be transmitted simultaneously from a portable terminal 12 to hub terminal 14. (ISDN technology has been widely discussed in the literature and so a review of the technology is not necessary here.) The ISDN channel typically carries a voice and a data channel, plus one low speed channel that is used for signaling and other system control/status. This conforms to the international CCITT "2B+D" basic rate interface (BRI) standard. For system control and messaging, the ISDN "D" channel is used. The BRI composite data rate is typically set at a 192 Kb/s frame rate and a 144 Kb/s data rate. Each "B" (bearer) channel runs at 64 Kb/s and the "D" channel runs at 16 Kb/s. The 144 Kb/s higher data rate is flow controlled down to a 19.2 Kb/s aggregate data rate over the satellite link to satellite 16. One of the "2B" channels can carry 2400 or 4800 bits per second of compressed voice using a LPC10E or a CELP encoding or other method. The other "B" channel can carry asynchronous data that is input on an RS-232, RS 422 or V.24 port on TIU 20 at any data rate up to 19.2K bits per second/s (when there is no voice transmission requirement). The limit of the aggregate sum of the data and any voice rate being 19.2 Kb/s. At hub terminal 14, a modem controller 22 must establish the link throughput rate. The rate a user inputs data into the RS-232/422 port or modem port on the TIU 20 is preferably transparent and is done in a LAN-to-LAN satellite link connection with modems at both ends of system 10. (LAN=local area network.) The preferred environment comprises a modem embedded in TIU 20 together with associated internal ISDN/X.25 PAD software. In a connection of TIU 20 to LAN, a file is spooled onto a hard disk in TIU 20 and then despooled out via a so-called Hayes-compatible modem protocol communications software resident in TIU 20.

In order to optimize both the satellite segment power usage by system 10 and more importantly to meet United States Federal Communications Commission (FCC) requirements for adjacent satellite power density radiation, system 10 employs automatic active power control in a system closed-loop operation. For a background in this area, refer to Gilhousen, et al., U.S. Pat. No. 5,056,109, issued Oct. 8, 1991. Hub terminal 14 examines all the signal-to-noise ratios of the signals being received and accordingly commands the remote terminals 12 to increase or decrease their respective transmit powers. The SNR varies because of weather conditions.

Hub terminal 14 adaptively controls the output power of all the remote terminals on a continuous basis. The RF power of hub terminal 14 does not adaptively change, but is set at a power required to overcome local rain induced signal fading. This power can be changed by an operator in a shared hub terminal 14 configuration, but it is preferably sized and permanently set in a private hub terminal 14 configuration. The portable terminal power information is carried on an ISDN "D" channel facility data link (FDL) as a forward and reverse orderwire (FOW/ROW). Hub terminal 14 then directs the remote terminals 12 to adjust their power accordingly to maintain a positive link margin during any rain fades.

In concert with automatic power control, hub terminal 14 establishes an automatic flow control over satellite 16 link data throughput rate on a continuous basis. The maximum allowed rate is determined on a call-by-call basis at the beginning of a call. The flow control is preferably transparent to a user. Regardless of the data rate that the user inputs into the system (e.g., up to 19.2 Kb/s), link communications are always at the highest rate the link will support, or the highest rate requested, based on signal-to-noise conditions over the link and as measured on an on-going basis. The flow control method is contained in the communications protocol and rate adaptation commands and is carried on the ISDN "D" channel FDL. This automatic action is carried on for both voice and data traffic. In a LAN-to-LAN connection, the user rate is first established during the call set up rate negotiation process. Both hub-to-remote and remote-to-hub directions are set. In a TIU 20 to LAN connection, the user can set up the TIU 20 transmission rate as part of an initial terminal configuration. The flow control commands from hub terminal 14 then will communicate with TIU 20 communications protocol to control the actual link throughput rate. This round trip control closes the control loop. Both the remote and hub terminals contain a buffer memory to maintain service continuity during overflow periods. The communications protocol supports A-START/-stop command to either a remote data terminal equipment (DTE), if LAN-to-LAN, or TIU 20, if TIU 20 to LAN, to control overflow.

Under the above conditions, the antenna size of terminal 12 can be practically reduced to a twenty inch parabolic reflector (without violating applicable FCC rules against radio illuminating too wide an area of the sky with excessive signal intensity). The higher off-axis beam of the smaller antenna is compensated for by a reduction of the transmitted power under clear sky conditions and by the spread-spectrum nature of the signal. When rainfall causes more attenuation, only then is the power increased to maintain the minimum signal-to-noise ratio (SNR). Because of the greater attenuation, adjacent satellite power density remains constant.

When the transmitter power of a particular terminal 12 or 14 has been automatically adjusted up to a predetermined maximum value and the SNR is nevertheless below a predetermined minimum, the bit error rates will necessarily suffer unless something is done about the situation. Under such conditions, the data being sent over an affected data link is repeated once, twice, or more times such that the effective data rate is reduced by some power of two. The redundancy thus introduced in the data stream counteracts the effects of bit errors.

Network and User Hub Access

Figure 2:
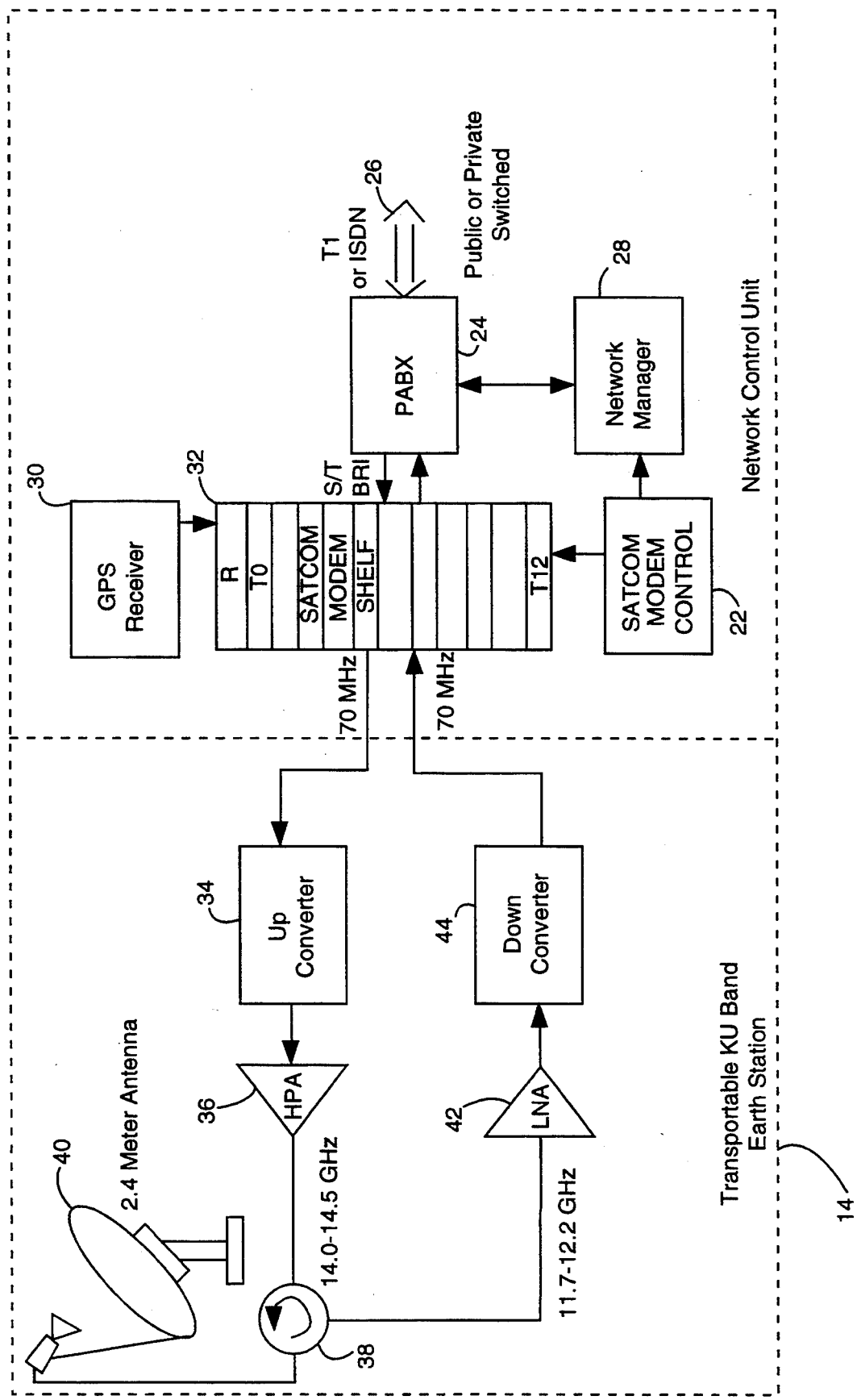
FIG. 2 is a block diagram of the hub terminal included within the system of FIG. 1.

In FIGS. 1 and 2, hub terminal 14 is shown to further comprise a private access branch exchange (PABX) 24 connected to a T1 telephone trunk 26 (or any suitable number of ISDN compatible lines), a network manager 28, a GPS receiver 30, a SATCOM modem shelf 32, an up converter 34 and a high power amplifier (HPA) 36 connected to an antenna coupler 38 and an antenna 40, a low-noise amplifier (LNA) 42 and a down converter 44. User access on both sides of PABX 24 is divided between two distinct control methods, multiple access from the remote user to the PABX 24 and inter-PABX 24 call control access to the public or private terrestrial networks. The two control methods are interrelated in that the call control method used to control PABX 24 will initiate the actions of assigning the multiple access modem channel at hub terminal 14 to a network access user. A communications software layer in which the call commands reside is different for the two functions. ISDN call set-up and tear-down commands (that are not specific to PABX 24) are contained in an OSI link (layers two and three, Q.921 and Q.931). Call control commands that are PABX 24 dependent are contained in the application layer (layer three) of the ISDN protocols. (e.g., above Q.931). All multiple access control commands, messages, alarm and status information, configuration and flow control information are contained in the ISDN "D" channel along with the telephone or data terminal dialing and supervisory signaling.

Multiple Access From the Remote User to Hub and PABX 24

A multiple access system from the portable users to the hub terminal 14 is used. A spread spectrum code time division and adaptive demand assigned multiple access system allows such multiple access. (Described in more detail below.) Table II provides a list of the messages and command strings that are contained in a typical ISDN "D" channel, including Q.931 messages. Some, however, are contained in the Q.921 link layer level. So this list is not necessarily complete.

TABLE II

| DESCRIPTION | "D" Channel Information | | |
|---|---|---|---|
| | INFORMATION | ROW | FOW |
| RF Power | Control Command | X | X |
| Data Rate | Control Command | X | X |
| Status | Terminal Summary | X | X |
| Alarm | Summary Alarm (major) (minor) | X | |
| database | Request for File Transfer (Alarm History/ Configuration) | X | |
| Terminal Configuration | Equipment Type | X | |
| | Equipment ID | X | |
| | Equipment Serial number | X | |
| | transmit Freq. | X | |
| | Rx Freq. | X | |
| | Priority Request Level | X | |
| Satellite | Satellite Ephemeris Info | | X |
| | Satellite Name | X | |
| Priority Request Level | (Level 1, 2 or 3) | X | |
| Latitude/ Longitude | Terminal Position Location | X | |
| | Hub Position | X | |

TABLE II-continued

| DESCRIPTION | "D" Channel Information | | |
|---|---|---|---|
| | INFORMATION | ROW | FOW |
| Synchronization Time | Location Code Time Slot Offset | X | X |
| Time | GPS Time | X | X |
| Date | GPS Date | X | X |
| Outgoing Call/ Inbound Call | Called Party ID (Phone number) | X | X |
| | Calling Party ID (Phone number) | X | X |
| Message Waiting | EMAIL | X | |
| | VOICEMAIL | X | |
| On Hook | Ready to Receive | X | |
| Off Hook | Ready to Send | X | |
| Dial Tone | Call Routing/Clear To Send | X | X |
| Busy Tone | Called Party Off Hook | X | X |
| Type of Call | Voice/Data | X | X |
| Call Progress Status | General Messages | X | X |
| | Call Waiting | X | |
| | Call Blocked (Standby) | X | |
| | Outgoing Call in Progress | X | |
| | Incoming Call in Progress | X | |
| Loopback Command | Remote Baseband | X | X |
| | Local (Remote Terminal) | X | |
| | Local (Hub Terminal) | X | |
| Broadcast Command Mode | Remote Transmitter Off | X | |
| | Text Messages | X | |
| | Un-numbered Polled Response | X | |
| | Selective Address | | |
| | Group Address | | |

The multiple access design is preferably based on a model of the anticipated behavior of the system. Such a network as system 10 might typically carry about 70% voice and 30% data. It is expected that a statistically average call duration will run approximately 1–3 minutes (higher data loading results in longer calls and reduces utilization). Based on such a call model, the network requirements are summarized in Table III.

TABLE III

| Network Requirements | | |
|---|---|---|
| Calls per Hour | 360–120 | |
| Avg. Call duration | 1–3 min. | |
| Activity Factor (Erlang B) | 5.83 (one call per 100 blocked up to three minutes) | |
| Number of Trunks (channels) Required (N) | 12 | |
| Request (reservation) calls per Hour | 360–120 | |
| Avg. Request Duration | 0.5–1.5 sec | |
| Activity Factor | 0.02 | |
| Number of Request channels required (R) | 1 | |
| ROW | Reverse Order Wire | "D" channel sub frame information from the remote to hub terminal 14 direction. |

TABLE III-continued

| Network Requirements | | |
|---|---|---|
| FOW | Forward Order Wire | "D" channel sub frame information from hub terminal 14 to the remote direction. |

System 10 will therefore support 120 to 360 users on a network with twelve trunks (SATCOM modem channels T0-T11) in and a call blockage rate of about one per 100 for up to three minutes. Since these numbers are statistical, they serve only to size system 10. Actual annual continuous usage profiles will determine the ultimate number of users practical on system 10. System 10 is capable of operation with lower bandwidths and a subsequent lower number of trunks (users). A matrix of the number of trunks, number of users, spread spectrum bandwidth (each direction) and maximum data rate is given below in Table IV, based on a fixed antenna size (variable EIRP) at terminal 12 and the traffic model described.

TABLE IV

| BANDWIDTH (25 dB) | Number of TRUNKS | Number of USERS | MAX. DATA RATE |
|---|---|---|---|
| 10 MHz | 48 | 1440 | 4.8 Kb/s (Voice or Data) |
| 10 MHz | 24 | 720 | 9.6 Kb/s |
| 10 MHz | 12 | 360 | 19.2 Kb/s |
| 5.0 MHz | 6 | 180 | 19.2 Kb/s |
| 2.5 MHz | 3 | 90 | 19.2 Kb/s |
| 5.0 MHz | 12 | 360 | 9.6 Kb/s |
| 2.5 MHz | 6 | 180 | 9.6 Kb/s |
| 5.0 MHz | 24 | 720 | 4.8 Kb/s (Voice or Data) |
| 2.5 MHz | 12 | 360 | 4.8 Kb/s (Voice or Data) |

The number of channels available in modem shelf 32 will limit the number of users that are able to access system 10. In turn, the aggregate data rate of all the channels, combined with the necessary uplink power at HPA 36 to maintain signal-to-noise margins will define the minimum size needed for antenna 40. Typically, antenna 40 has a 2.4 meter diameter. The required transmit power in amplifier 36 is five watts, in this example. System 10 may have means for detecting voice activity (VOX), such as pauses in speech, which may then be used to activate a power on and off control. A VOX operated system can increase the number of users able to share satellite transponder power from 360 to as many as 500, (e.g., at a 30%-40% duty cycle). System 10 operational parameters that define adaptive demand assigned multiple access are therefore, adaptive automatic power control, adaptive automatic data throughput rate flow control, VOX operation, if used, and dynamic reassignment of multiple access users to new channels on a call-by-call basis.

Figure 3:
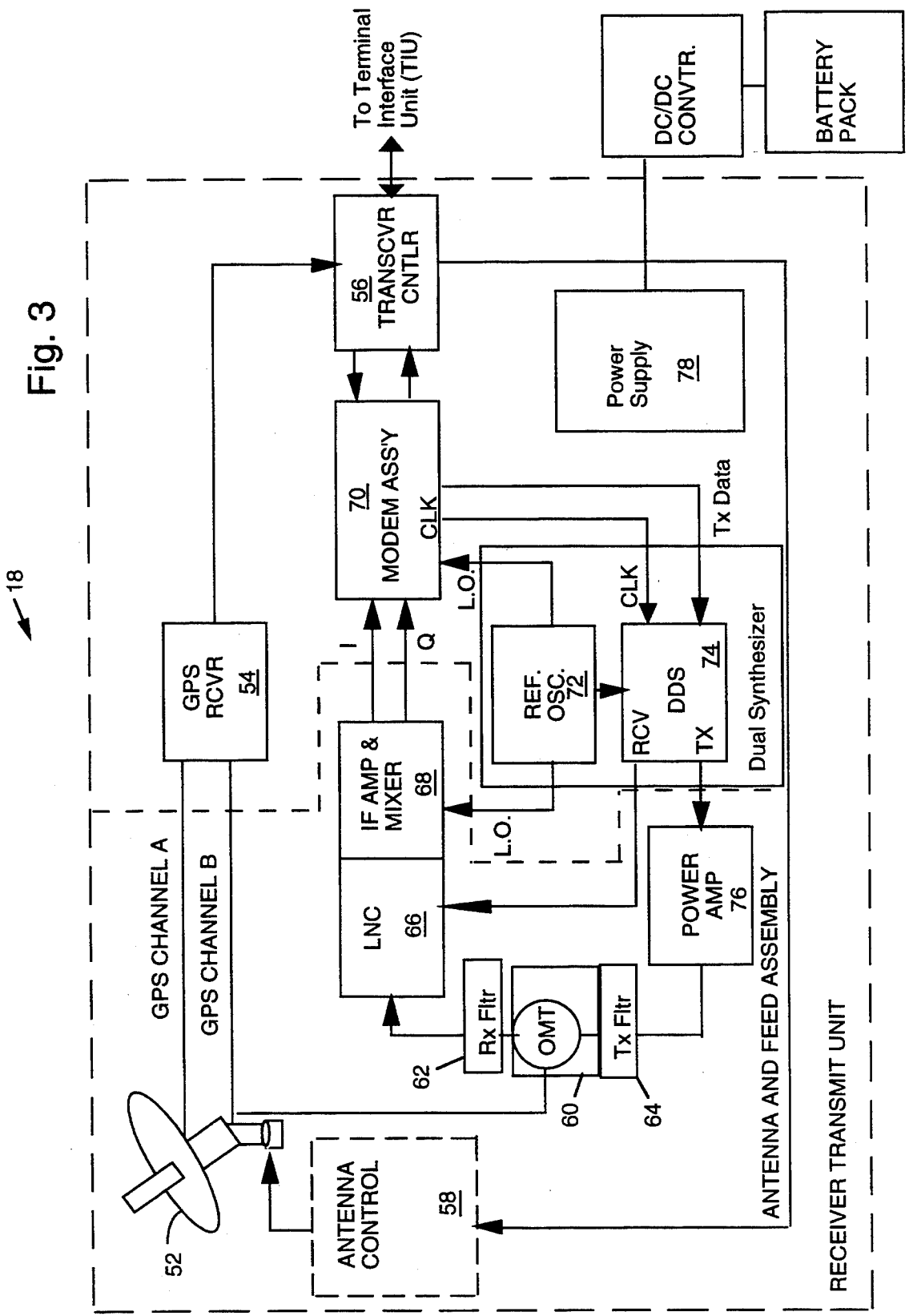
FIG. 3 is a block diagram of the portable receive transmit unit (RTU) within the system of FIG. 1.

FIG. 3 illustrates that RTU 18 comprises an antenna 52, a GPS receiver 54, a transceiver controller 56, an antenna position/polarizing control 58, an OMT 60 with a receive filter 62 and transmit filter 64, a low noise converter (LNC) 66 which combines a low noise amplifier and downconverter, an intermediate frequency (IF) amplifier and mixer 68, a modem 70, a reference oscillator 72, a dual direct digital synthesizer (DDS) 74, a power amplifier 76 and a power supply 78. Within RTU 18, a data link control protocol running on both the "D" channel and the "B" data channel (but not voice) will undergo a protocol conversion from LAPD to LAPM. This is necessary to ensure improved network transmission data throughput as a result of the extended satellite round trip delay time. LAPM provides the necessary features. Prior to any of the remote terminals gaining network access, hub terminal 14 is powered up and begins broadcasting network acquisition timing on a timing control channel. The following subset of "D" channel information is sent in the FOW of the request channel: hub latitude/longitude, GPS time, GPS date, broadcast mode messages sent to a specific HDLC frame address or to a general group address, don't go off-hook and RF power inhibit (remote transmitter off).

Figure 4:
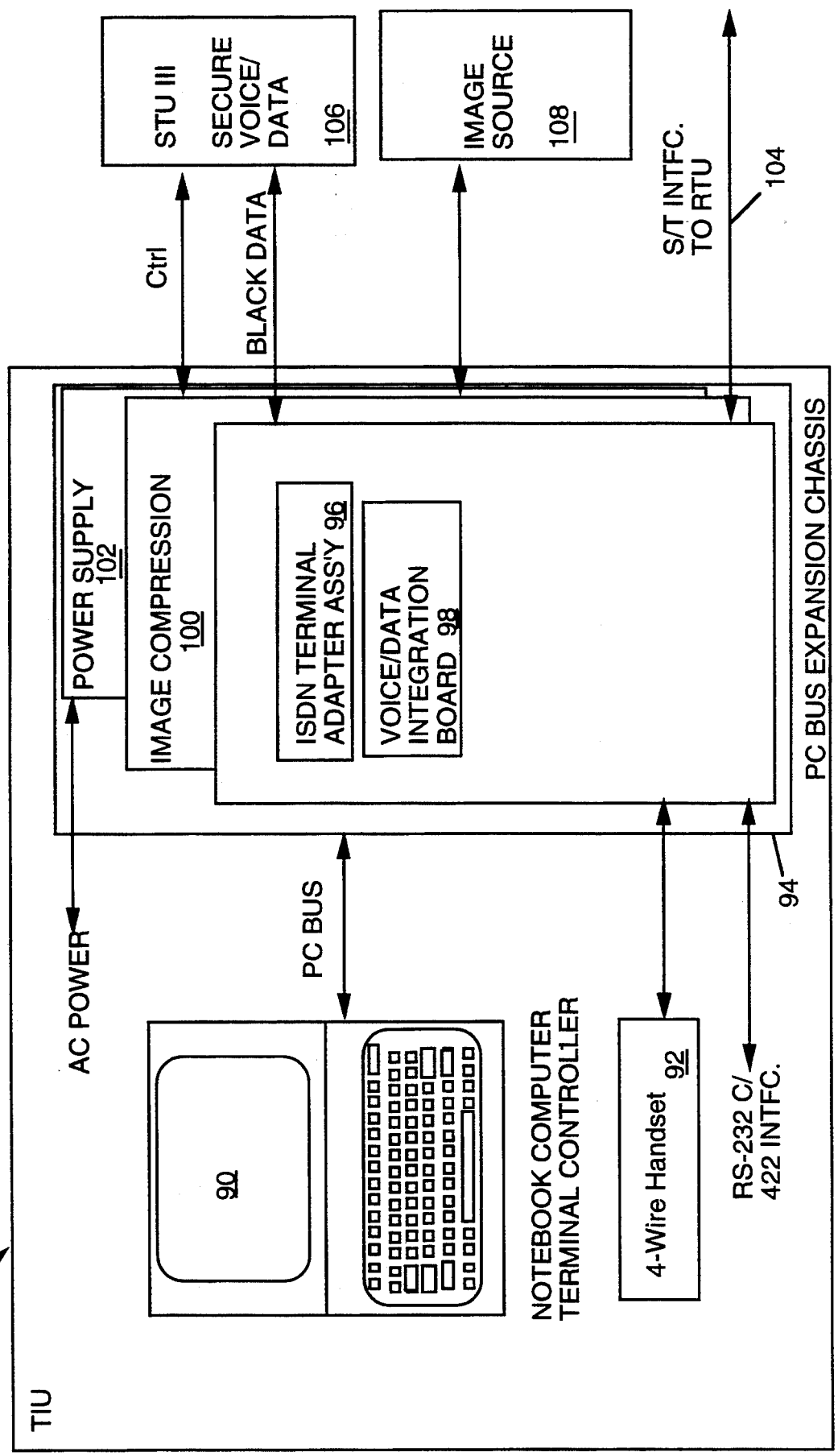
FIG. 4 is a block diagram of the portable terminal interface unit (TIU) within the system of FIG. 1.

FIG. 4 illustrates TIU 20 which is comprised of a notebook computer terminal controller 90 and four-wire handset 92 both attached to a PC bus expansion chassis 94, which houses an ISDN terminal adapter 96, a voice/data integration board 98, an image compression board 100, a power supply board 102, an image source 106 and a S/T interface 104 for connection of TIU 20 to RTU 18. TIU 20 and RTU 18 are each preferably housed in a suitcase-like luggage carrier to facilitate field portability. External to TIU 20, users may have image sources or encrypted signals, such as a secure encoder/decoder 106 and an image source 108, connected to the expansion chassis 94.

Preferably, it should be demonstrable that system 10 will neither interfere with nor be interfered upon by primary service providers in the fixed satellite service (FSS). These requirements are complied with in the following ways:

The Power Density Requirements—FCC Declaratory Order (footnote 35), which is based on part 25.209 (f) "Antenna Performance Standards", is complied with by using spread spectrum modulation to meet the power density requirements.

Interference—Susceptibility to interference from FSS and terrestrial sites are complied with by using spread spectrum modulation to reduce interfering emitters.

Antenna Elevation—The minimum elevation angle, part 25.205, is complied with by setting angles greater than 5°.

Emission Limitations—Limitations, part 25.202 (g) are complied with by appropriate filtering and the use of a special continuous phase modulation waveform.

Global Positioning Satellite (GPS) Information

System 10 uses the GPS satellite time base as a system synchronization time base for the ground segment. The following information is generally available from the GPS signal: frequency $\pm 4 \times 10^{-12}$, GPS time $\pm 1$ microsecond (better resolution is available), ranging "C/A" code, navigation data, satellite ephemerides (orbital location) and accuracy, clock behavior and correction, satellite status, latitude and longitude (within 100 meters) and altitude (within 100 meters). The dual GPS antenna 52 mounted on the RTU 18 is used to provide automatic antenna pointing control.

Ground Based Network Segment

The ground based network segment consists of RTU 18, TIU 20 and hub terminal 14. At hub terminal 14, SATCOM modem shelf 32 comprises fourteen modems, twelve of which are traffic modems and one of which is allocated as the reservation channel. A group modulator with timing transmitter, power supply and modem controller is preferably integrated with the modems into the (B1) modem assembly. Physically, hub terminal 14 is housed in a nineteen inch rack with shelves for placement within a sheltered hub facility. It is anticipated that hub terminal 14 minus the PABX 24 will occupy three 6-RMU shelves.

Network management functions are partitioned between two major classes of activities, (A) dynamic modem control of the CPMMA activities of call set-up, tear-down and trunk assignment processed via point-to-multipoint bus in SATCOM modem controller 22, (B) static control, diagnostics, traffic analysis and maintenance functions under data base management. Software allocated to dynamic modem control is resident in the SATCOM modem controller 22. Access to modem controller 22 from the remote location is via PABX 24. Software allocated to static control, diagnostics, traffic analysis and maintenance is resident in a management system CPU and user terminal located remote from hub terminal 14. Within the functions relegated to static control, access to PABX 24 provides a means of optimizing network costs. The description of demand is a survey of the behavior of system 10 users. The following is information which is available: the time a channel was assigned (transaction starts), the address of the user terminal (caller phone number), hub terminal 14 address, the type of transaction (voice or data), data rate, the time the channel was released (transaction ends) and utilization. Utilization information is affected by bit error rate and propagation, but is a measure of calls processed (number calls accepted versus number of call attempts). Manager 28 preferably maintains a database to develop a histogram of the number of trunks that are active on an average basis. Low average activity allows more terminals to operate into a given set of trunks, thereby lowering costs/user. Other performance related criteria monitored via manager 28 are: throughput-average rate in bits per second of hub terminal 14 including re-transmission overhead, response-time percent of requests handled within a specified time (e.g., 95% within five seconds), busy rate-percent of requests that were blocked during a measurement period and maintenance diagnostics and history-database Network Interface Standard System 10 conforms to the international Open Systems Interconnection (OSI) standards for layers one through three within the ground based segment and to the upper layers four through seven at PABX 24 and public network access interfaces, see Table VI.

TABLE VI

| OSI LEVEL | DEFINITION | DESCRIPTION |
|---|---|---|
| Level 1 | Physical Layer | The physical layer is user defined and consists of the following:<br>1. Transport-Microwave;<br>2. Multiple Access;<br>3. Reservation- Aloha Like Contention Using Layer 2 & 3 protocols;<br>4. Coding-Convolutional K = 7/Viterbi decoding<br>5. Modulation- CPM/SPREADSPECTRUM.<br>6. Voice: four-wire handset;<br>7. Data: RS-232-C;<br>8. Data: V.24 Option via COM2 interface in TIU 20; and |

TABLE VI-continued

| OSI LEVEL | DEFINITION | DESCRIPTION |
|---|---|---|
| Level 2 | Link Layer | 9. ISDN BRI-Per I.441 Standard S/T interface.<br>Type: HDLC with Q.921 LAPD to LAPM protocol conversion per CCITT V.42 standards using Extended Asynchronous Balanced Mode Sequence (SABME) over satellite link flow control: Selective reject/LAPM. Frame Length- Approx. 1024 bits/ HDLC frame packet (900–1100) Window Size- Mod 128 framing. |
| Level 3 | Network Layer | Access: Reservation & Trunk Access via CTD/ADAMA Signaling: Q.931/LAPD "D"<br>Voice & Data- Full Function "D4" Channel Bank Compatible (ISDN Option) |
| Level 3+ | Applications Layer | Call Control-Q.931 Upper Layer Applications to PABX 24. |

Network simulations of the link layer protocols for two bit error rates and iterated propagation delays indicate the optimum packet length and window size (number of not acknowledged outstanding frames) that can be in the sequence of re-transmission. With satellite round trip propagation delay (500–700 milliseconds) that the Modulo-8 standard is too short. A window size of fifty is adequate but the next value is Modulo-128 (extended mode). Modulo-128 is used. No gain in throughput is achieved with a packet length above 1024 bits and performance is degraded at higher packet lengths particularly for the lowest data rate.

Code Time Slots

System 10 supports multiple users by time positioning the same maximal length code (MLC) in a CPMMA environment. An MLC with a 1023 chip length is transmitted with reference to a reference time period. The MLC size of 1023 is not in any way special or unique. The size can be easily changed in a network design to accommodate various network sizes and configuration types. Initially, GPS time is used for the reference and later, hub terminal 14 issues adjustments of the reference to optimize its own signal reception. The MLC repeats after each 1023 chips have been transmitted. No extra chips are needed for splicing together adjacent MLCs that have been modulated with different data. A multiplicity of transmissions can occur simultaneously and all use the same time period structure which is referenced to a common standard. The hub terminal 14 can transmit and receive code position modulated multiple access (CPMMA) waveforms simultaneously in at least one subperiod. The time reference output of a GPS receiver is suitable for this purpose. The time standard can also be embedded in the communication signal itself as a unique time signature in the waveform. At the beginning of each time period, each user MLC sequence starts at a point in the MLC from the first to the $1023^{rd}$ chip, depending on the data to be sent and the user to receive it. The minimum amount of code position change does not have to be only one chip. A larger number of chips can be used, and in some types of transmissions this may be preferable.

In FIG. 5, a MLC 120 is comprised of 1023 chips consisting of a first chip ($C_1$)=zero, a second and third chip ($C_2$ and $C_3$)=ones, a plurality of fourth through $1020^{th}$ chips ($C_4$–$C_{1020}$)=zero, a $1021^{st}$ chip ($C_{1021}$)=zero, a $1022^{nd}$ chip ($C_{1022}$)=one and a $1023^{rd}$ chip ($C_{1023}$)=zero. The particular code represented here for MLC 120 was chosen merely for the sake of this explanation. Other codes are possible from the set of maximal length 1023 long codes. Other code lengths can be used as well. Four transmissions of MLC 120 are illustrated in FIG. 5, a first transmission 121 beginning at time zero ($t_0$) and ending at time one ($t_1$), a second transmission 122 beginning at $t_1$ and ending at time two ($t_2$), a third transmission 123 beginning at $t_2$ and ending at time three ($t_3$) and a fourth transmission 124 beginning at $t_3$ and ending at time four ($t_4$). Transmissions 121–124 differ only in which chip $C_1$–$C_{1023}$ ($C_i$) begins at the respective time reference $t_0$–$t_3$ ($t_i$). The pattern of MLC 120 in each transmission 121–124 is the same. This is apparent if the reader regards MLC 120 as having its tail connected to its head to form a circular pattern. The difference in time between $t_i$ and when chip $C_1$ is transmitted is used in the present invention to encode information on what looks to be an otherwise conventional spread spectrum carrier.

Since each transmission 121–124 is 1023 chips long, chip $C_1$ of MLC 120 can be transmitted in any one of 1023 starting chip positions $C_i$. If all of these positions are used to communicate data, then a ten-bit parallel data ($D_j$) can be transferred every transmission period $t_i$ to $t_{i+1}$. (1023 is equal to $2^{10}-1$.) Transmission 121 is illustrated as having been modulated by the ten-bit value of 00,0000,0000 ($D_{00\,0000\,0000}$). Transmission 122 is illustrated as having been modulated by the ten-bit value of 11,1111,1111 ($D_{11\,1111\,1111}$). Transmission 123 is illustrated as having been modulated by the ten-bit value of 00,0000, 0001 ($D_{00\,0000\,0001}$). And, transmission 124 is illustrated as having been modulated by the ten-bit value of 00,0000,0011 ($D_{00\,0000\,0011}$). The rate bits of information are communicated by each transmission 121–124 can be increased by modulating the phase of MLC 120, such as adding to or concatenating the CPM waveform with conventional phase shift key or continuos phase modulation. In the preferred embodiment, the CPM signal is modulated also by binary continuous phase modulation with a modulation index of one half (90°increase or decrease in phase per bit). The communication rate of 1023 bits per transmission period $t_i$ to $t_{i+1}$ can be used to support data and address. For example, six bits of Di can be assigned to communicate user address and four bits assigned to represent four bits of data. The data and user address transmitted are shown by example in Table VII.

TABLE VII

| Starting Chirp | Data | User |
|---|---|---|
| 1 | 0000 | A |
| 2 | 0001 | A |
| 3 | 0010 | A |
| 4 | 0011 | A |
| 5 | 0100 | A |
| 6 | 0101 | A |
| 7 | 0110 | A |
| 8 | 0111 | A |
| 9 | 1000 | A |
| 10 | 1001 | A |
| 11 | 1010 | A |

TABLE VII-continued

| Starting Chirp | Data | User |
|---|---|---|
| 12 | 1011 | A |
| 13 | 1100 | A |
| 14 | 1101 | A |
| 15 | 1110 | A |
| 16 | 1111 | A |
| 17 | 0000 | B |
| 18 | 0001 | B |
| 19 | 0010 | B |
| 20 | 0011 | B |
| 21 | 0100 | B |
| 22 | 0101 | B |
| 23 | 0110 | B |
| 24 | 0111 | B |
| 25 | 1000 | B |
| 26 | 1001 | B |
| 27 | 1010 | B |
| 28 | 1011 | B |
| 29 | 1100 | B |
| 30 | 1101 | B |
| 31 | 1110 | B |
| 32 | 1111 | B |
| 33 | 0000 | C |
| 34 | 0001 | C |
| 35 | 0010 | C |
| 36 | 0011 | C |
| 37 | 0100 | C |
| 38 | 0101 | C |
| 39 | 0110 | C |
| 40 | 0111 | C |
| 41 | 1000 | C |
| 42 | 1001 | C |
| 43 | 1010 | C |
| 44 | 1011 | C |
| 45 | 1100 | C |
| 46 | 1101 | C |
| 47 | 1110 | C |
| 48 | 1111 | C |
| ... | ... | ... |
| 1023 | 1111 | n |

FIG. 6 illustrates a correlator 150 that is used to detect the modulation method described in connection with FIG. 5. Correlator 150 comprises a pattern delay and distribution unit 152, a mixer 154 having an input from a pattern signal 155, a mixer 156 having an input from a pattern signal 157, a mixer 158 having an input from a pattern signal 159, a mixer 160 having an input from a pattern signal 161, a mixer 162 having an input from a pattern signal 163, a mixer 164 having an input from a pattern signal 165 and so on through to a mixer 166 having an input from a pattern signal 167. A signal 168 is input to unit 152 corresponding to MLC 120 starting chip $C_1$ at time $t_i$. A signal 170 is the CPMMA from the communications receiver, such as in RTU 18 (FIG. 3). A signal 172 provides a chip clock such that MLC 120 patterns appear on signals 155, 157, 159, 161, 163, 165 and so on through 167 that are offset in time by one chip sequentially from one to the next. For example, an MLC 120 pattern is output by unit 152 on signal 155 with chip $C_1$ beginning at time $t_0$. Similarly, an MLC 120 pattern is output by unit 152 on signal 157, but with chip $C_1$ beginning at time $t_1$. Correlator 150 has a one-of-1023 output that can be encoded to produce a ten-bit binary.

FIGS. 7A and 7B illustrate the signal inputs and outputs of unit 152, which can be constructed from a 1023-stage shift register that shifts a time referenced MLC pattern input by signal 168 sequentially to each of the output signals 155, 157, 159, 161, 163, 165 and so on through 167 by one, at each tick of the chip clock on signal 172. Signal 168 has an MLC 120 pattern that has been synchronized to time $t_i$. Mixers 154, 156, 158, 160, 162, 164 and so on through 166 individually compare signals 155, 157, 159, 161, 163, 165 and so on through 167 to signal 170. For the transmissions of FIG. 5, mixer 154 will output a match data $D_{00\ 0000\ 0000}$ at $t_1$ because transmission 121 will match the pattern $P_{00\ 00000\ 0000}$ on signal 155. Mixer 166 will output a match data $D_{11\ 1111\ 1111}$ at $t_2$ because transmission 122 will match the pattern $P_{11\ 1111\ 1111}$ on signal 167. Mixer 156 will output a match data $D_{00\ 0000\ 0001}$ at $t_3$ because transmission 123 will match the pattern $P_{00\ 00000\ 0001}$ on signal 157. Mixer 160 will output a match data $D_{00\ 0000\ 0011}$ at $t_4$ because transmission 124 will match the pattern $P_{00\ 00000\ 0011}$ on signal 161. During any single time interval, only one mixer output will produce a match. The match can be detected by accumulating the output values over the whole time interval. The mixer output that matches has a value of 1023 because each chip of the 1023 pattern steps would have matched. Another mixer can only match randomly. With a true MLC pattern, such a random match would only accumulate to an amplitude of one. A peak detector (FIG. 7A) is able to identify which pattern 152 matched the received signal. The corresponding data pattern is output as the communicated ten-bit (parallel) data value.

With 1023 pattern outputs and mixers, correlator 150 may be more than a particular user needs or wants. Correlator 150 is a relatively large digital circuit, due mainly to its large number of stages (1023). A more practical correlator 180 that produces four-bit data for a particular one of a six-user address is described below. Data $D_{00\ 0000\ 0000}$ through $D_{00\ 0000\ 1111}$ can be used to communicate four bits to only a single user, for example, user zero ($U_0$). Other data are used to communicate the same four bits to other users (e.g., users one through sixty-three, $U_1$-$U_{63}$).

Sixteen Slot Correlator

Correlator 180, illustrated in FIG. 8, is a sixteen slot device in a single integrated circuit that has a sixteen channel by "n" (arbitrary length) correlator with an internal pseudo random noise generator 182 to generate a pattern (e.g., MLC 120) against which inputs (e.g., signal 170) are to be correlated. In addition, this configuration also detects binary continuous phase modulation at a rate of one bit of modulation per code block. This increases the number of bits of data communicated per code block from four to five. The pattern applied to each correlation channel is delayed by one chip time period from the previous channel to provide a window to sixteen contiguous code time slots. Each slot has an "odd" input 184 and an "even" input 186 which correlates with odd and even (alternating sequential) bits of the pattern generator. A plurality of adders 188 does a summation of the product of the odd input multiplied by the odd half code with the even input multiplied by the even half code is accumulated in accumulators 190 to provide the correlation amplitude. An additional accumulator 191 in each slot provides for averaging from one to sixteen times. An absolute value circuit 192 after the correlation accumulator 190 provides a correlation energy detection function when desired. In this case, the second accumulator 191 becomes a smoothing circuit. A peak detection circuit 194 determines which slot has the largest signal, together with various other ancillary functions. Peak selection is externally adjustable (if desired) to serve as a detector at a desired slot number. Communication and control of correlator 180 is done through an input/output (I/O) interface 196 having a register bank 198. Table VIII summarizes the register functions in register bank 198. The output data is available both from the interface 196 and through a separate hardware interface 209 for convenience of design in multiprocessor circuitry, such as may be used in modems 32 and 70 (FIGS. 2 and 3, respectively).

TABLE VIII

| I/O Register Definitions | | | |
|---|---|---|---|
| R/W | Address | Function | Bit Positions |
| write | 0 | start vector | 0-11 |
| write | 1 | acquire/run* | 0 |
| write | 2 | average count | 0-3 |
| read | 3 | data avail | 0 |
| read | 4 | chip timing | 0-7 |
| read | 5 | peak | 0-5 amplitude, 6-9 position |
| read | 6 | noise | 0-7 |
| write | 7 | offset | 0-7 |
| write | 8 | scale 0 | 0-2 |
| write | 9 | scale 1 | 0-2 |
| write | 10 | tap values | 0-11 |
| write | 11 | A-START | 0-15 |
| write | 12 | B-START | 0-15 |
| write | 13 | Bus Sel | 0-3 |
| write | 14 | Bus Sel En | 0 |
| read | 15 | Clip 0, Clip 1 | 0, 1 |

Accumulator Functionality

Accumulator arithmetic is two's complement, so polarity is inherent in the selected bits. Accumulators 190 and 191 limit at ±full-scale, but not wraparound. The scale control of an accumulator uses a six-of-ten or six-of-twelve output selector. See Table IX.

TABLE IX

| Scale Value | Output Bits Selected |
|---|---|
| 0 | 0-5 |
| 1 | 1-6 |
| 2 | 2-7 |
| 3 | 3-8 |
| 4 | 4-9 |
| 5 | 5-10 |
| 6 | 6-11 (if applicable) |

The scale function is latched in from register bank 198 by a reset, line for accumulator 191 and by the LD0 line for accumulator 190. OFFSET is the initial value loaded into all accumulators 190 when a line LD0 sees a positive edge. It is loaded into the eight least significant bits of the accumulator 190 and is a two's complement number. EVEN-IN and ODD-IN are offset in time by one cycle of GEN-CLOCK. (This is a result of the binary continuous phase modulation.) LD0 (accumulator 190) and reset (accumulator 191) are synchronous and applied to all accumulator stages on the next clock edge and allow a continuation of normal accumulation on the subsequent clock edge.

Clipping Flags

Each accumulator has an internal detector which indicates via CLIP0 and CLIP1 when the absolute value of the accumulator output is greater than the elected scale, for example, when the output scaler would be clipping the output signal. The detectors of all accumulators 190 are logically OR'ed into a single flag bit CLIP0. The detectors of all accumulators 191 are OR'ed to another single flag bit CLIP1. CLIP0 and CLIP1 are reflected in register bank 198 at register address fifteen, bits zero and one. Automatic dual-mode readout is preferable, such that if a microprocessor reads at a rate equal to the MLC repetition rate, then each read will be the latest clipping value. If the microprocessor reads at a lower rate, then the value will indicate if any clipping occurred since the last read.

Correlator 180 uses a plurality of multipliers 200 and accumulators 190 and 191 to provide an output value that is the correlated value of the EVEN-IN signal against the A-OUT of PRN generator 182 together with the ODD-IN signal against B-OUT. The value can then be averaged or smoothed for as many as sixteen times. The input multipliers 200, adder 188 and accumulators 190 provide the necessary receiver correlation function. Accumulator 191 provides an averaging/smoothing function. EVEN-IN and ODD-IN differ in their respective transition times by one cycle of GEN-CLOCK (which is similar to chip clock signal 172, FIG. 6). A group of de-staggering latches 202-204 realign the signal timing of the staggered EVEN-IN and ODD-IN signals. Matching code inputs "A" and "B" are aligned within PRN generator 182. A $T_{zero}$ input determines the period the correlation process has to run before a reset occurs. Correlator 180 has inputs AVG-COUNT and AVG-START that control the length of averaging, one through sixteen units of $T_{zero}$ in factors of two and the relative phasing of the averaging block. A modulo-n counter 206 sets its modulus to one plus the AVG-COUNT. If AVG-COUNT is zero, then no averaging is done and each $T_{zero}$ causes the contents of accumulator 190 to go straight through to an output register 208. If AVG-COUNT is fifteen, then sixteen averages are done by accumulator 191 for each time output register 208 is loaded. Absolute value circuit 192 is turned on during signal acquisition to change the correlator function to a correlation energy detector. Accumulator 191 then becomes a smoothing circuit.

PRN generator 182 has a selectable length maximal-length shift register generator with a synchronously presettable start vector. PRN generator 182 has two sets of sixteen outputs labeled as "A" and "B" outputs, which are the last sixteen even bits and the last sixteen odd bits of the pattern, respectively. The A and B outputs are also synchronously presettable to A-START and B-START. All three preset vectors are loaded on the next positive GEN-CLOCK edge after the $T_{zero}$ input goes low. On the next edge, PRN generator 182 commences code generation in synch with the next clock. A and B outputs change state simultaneously. The relative timing and delays of A-OUT, B-OUT, EVEN-IN and ODD-IN cause all state changes to be synchronous. The relative timing and delays of A-OUT, B-OUT, EVEN-IN and ODD-IN and the values of start vector, A-START and B-START are such that the first sampled signal input (defined to be at EVEN-IN) can be correlated with the first bit of the pattern sequence (defined to be at A-OUT0).

Peak Selector/Mux Functionality

Peak selector 194 scans through the several register outputs 208 when correlation and averaging is finished. It then chooses the largest peak magnitude (positive or negative) or, if so directed, outputs the amplitude of an externally selected slot.

Peak Selector Timing

Peak selector 194 completes its tasks as quickly as practical after a start command. Processing begins on the first positive clock edge after a start. The start is applied one clock cycle after a reset. Peak selector 194 preferably examines at least one register output 208 per clock cycle. A noise value is preferably accumulated from the absolute values of all sixteen representative amplitudes and the absolute values of the peak and the slot on each side of the peak are subtracted to obtain a final noise value.

Time and Frequency Requirements

Correlator 180 is a synchronous device, although all the external bus functions are asynchronous. Internally, signals on the bus are applied synchronously. Other functions involving a readout of data are asynchronous. Data may be read out at any time starting when it is available and ending before an update. The most fundamental clock is $T_{zero}$, which occurs no more often than the pattern code repetition period. The GEN-CLOCK input is the frequency which paces PRN generator 182. The consequent cycle time ambiguity between even and odd half codes is removed by resetting a divider with $T_{zero}$.

General Considerations

All clock inputs are positive edge triggered. All mode controls are level sensitive. All reset and load controls are synchronously applied inside the integrated circuit, except this does not apply to the bus external read/write and load controls.

Although the present invention has been described in terms of the presently preferred embodiments, it is to be understood that the disclosure is not to be interpreted as limiting. Various further alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver, comprising:
   signal input means for receiving a maximal length code (MLC) that has been time shifted in relation to a system reference time in order to communicate a data;
   clock input means for receiving a signal synchronized to said system reference time and for outputting a synchronizing signal $T_{zero}$;
   pattern generating means for producing a first replica of said MLC and to synchronize said first MLC replica to said synchronizing signal $T_{zero}$;
   shift register means for producing a plurality of replica MLC patterns from said first MLC replica shifted in time by at least one MLC chip time period per output;
   multiplier accumulator means for correlating each of the several MLC replicas to said MLC at the signal input means; and
   output means for identifying the best match that occurs between each of the several MLC replicas to said MLC at the signal input means.

2. The receiver of claim 1, further comprising:
   a plurality of correlators connected to the signal input means for respectively detecting amplitude, phase and chip timing of said MLC wherein data is demodulated from said MLC.

3. A communications system including at least one hub terminal and a plurality of remote terminals capable of communicating data over a plurality of satellite data links, the system comprising:
   sensor means connected to a satellite communications receiver for determining the signal-to-noise ratio (SNR) of a satellite data link between a hub terminal and a remote terminal;

control means connected to said satellite communications receiver and a satellite communications transmitter for increasing and decreasing transmission power of said satellite communications transmitter in order to maintain a predetermined minimum signal-to-noise ratio (SNR) over said satellite data link; and data repeating means connected to the control means for duplicating and repeating data in said satellite data link according to a power level established by the control means.

4. A communications system, comprising:

time base means for providing system synchronization and including receiver means for receiving navigation satellite transmissions of accurate time;

a hub terminal having a private access branch exchange (PABX) for communication with telephone trunk lines and having spread spectrum modulation means for code division multiple access (CDMA) radio communication with an orbiting communication satellite, wherein a maximal length code (MLC) that forms a basis for said spread spectrum modulation of said CDMA radio communication is synchronized to said accurate time provided by the time base means for code position modulated multiple access (CPMMA) between said communications satellite and the hub terminal; and a plurality of remote terminals each having a user telephone interface and spread spectrum modulation means for code division multiple access (CDMA) radio communication with said orbiting communication satellite using a single maximal length code (MLC) for all of said remote terminals as a basis for simultaneous spread spectrum modulation of said CDMA radio communication, wherein each identical MLC is independently synchronized to said accurate time provided by the time base means for providing code position modulated multiple access (CPMMA) between said communications satellite and each one of said remote terminals;

wherein selective connections are provided from said telephone trunk lines through the hub terminal and communications satellite to respective ones of the plurality of remote terminals.

5. The system of claim 4, wherein:

the hub terminal includes analyzing means for assessing the quality of signals received from the remote terminals through said communications satellite; and the remote terminals each include control means for adjusting the level of their respective radio power outputs to said communications satellite in response to commands received from the hub terminal.

* * * * *